(12) United States Patent
Zhao et al.

(10) Patent No.: US 12,143,206 B2
(45) Date of Patent: Nov. 12, 2024

(54) DYNAMIC MCS OFFSET FOR SHORT TTI

(71) Applicant: Telefonaktiebolaget LM Ericsson (publ), Stockholm (SE)

(72) Inventors: Hongxia Zhao, Mölndal (SE); Laetitia Falconetti, Järfälla (SE); Daniel Chen Larsson, Lund (SE); Jingya Li, Gothenburg (SE); Henrik Sahlin, Mölnlycke (SE); Mårten Sundberg, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 174 days.

(21) Appl. No.: 16/308,271

(22) PCT Filed: Feb. 2, 2018

(86) PCT No.: PCT/EP2018/052648
§ 371 (c)(1),
(2) Date: Dec. 7, 2018

(87) PCT Pub. No.: WO2018/141903
PCT Pub. Date: Aug. 9, 2018

(65) Prior Publication Data
US 2019/0199468 A1 Jun. 27, 2019

Related U.S. Application Data

(60) Provisional application No. 62/454,430, filed on Feb. 3, 2017.

(51) Int. Cl.
*H04L 1/00* (2006.01)
*H04L 1/1812* (2023.01)
(Continued)

(52) U.S. Cl.
CPC .......... *H04L 1/0003* (2013.01); *H04L 1/0025* (2013.01); *H04L 1/0026* (2013.01);
(Continued)

(58) Field of Classification Search
CPC ... H04L 1/0003; H04L 1/0025; H04L 1/0026; H04L 1/1812; H04L 5/0053;
(Continued)

(56) References Cited

U.S. PATENT DOCUMENTS

2014/0056273 A1   2/2014   Jang et al.
2015/0163794 A1*  6/2015   Liang ............... H04W 72/0413
                                              370/329

(Continued)

FOREIGN PATENT DOCUMENTS

CN      104823389 A    8/2015
JP      2013526110 A   6/2013
(Continued)

OTHER PUBLICATIONS

3GPP TS 36.211 v13.0.0; Technical Specification; 3rd Generation Partnership Project; Technical Specification Group Radio Access Network; Evolved Universal Terrestrial Radio Access (E-UTRA); Physical channels and modulation (Release 13)—Dec. 2015.
(Continued)

*Primary Examiner* — Won Tae C Kim
(74) *Attorney, Agent, or Firm* — Baker Botts L.L.P.

(57) ABSTRACT

According to some embodiments, a method in a network node comprises: determining that uplink control information, UCI, and a data payload will be sent via a physical uplink shared channel on a slot/subslot transmission; determining a modulation coding scheme, MCS, offset for transmission of the UCI via the physical uplink shared channel; and communicating the MCS offset to a wireless device. According to some embodiments, a method in a wireless
(Continued)

800

| 812 - determine that UCI and a data payload will be sent via a PUSCH on a slot/subslot transmission |

| 814 - determine a MCS offset for transmission of the UCI via the PUSCH |

| 816 - communicate the MCS offset to a wireless device | device comprises: determining that UCI and a data payload will be sent via a physical uplink shared channel on a slot/subslot transmission; receiving a MCS offset for transmission of the UCI via the physical uplink shared channel; and communicating, to a network node, the UCI using the MCS offset. The UCI and the data payload may be sent via the physical uplink shared channel with a slot/subslot transmission or a short transmission time interval (sTTI).

15 Claims, 12 Drawing Sheets

(51) Int. Cl.
    *H04L 1/1829*     (2023.01)
    *H04L 5/00*     (2006.01)
    *H04W 72/12*     (2023.01)
    *H04W 76/27*     (2018.01)

(52) U.S. Cl.
    CPC .......... *H04L 1/1812* (2013.01); *H04L 1/1854* (2013.01); *H04L 1/1861* (2013.01); *H04L 5/0023* (2013.01); *H04L 5/0053* (2013.01); *H04W 72/12* (2013.01); *H04L 1/0031* (2013.01); *H04L 5/0055* (2013.01); *H04L 5/0057* (2013.01); *H04W 76/27* (2018.02)

(58) Field of Classification Search
    CPC .... H04L 1/1861; H04L 1/1854; H04W 76/27; H04W 72/1205
    See application file for complete search history.

(56) References Cited

U.S. PATENT DOCUMENTS

| | | | |
|---|---|---|---|
| 2015/0289211 A1* | 10/2015 | Lee | H04L 5/14 370/328 |
| 2016/0057735 A1* | 2/2016 | Liu | H04L 1/0003 370/329 |
| 2016/0226623 A1* | 8/2016 | Fröberg Olsson | H04L 1/1812 |
| 2016/0226632 A1 | 8/2016 | Zhang et al. | |
| 2016/0226636 A1 | 8/2016 | Seo et al. | |
| 2017/0041921 A1* | 2/2017 | Oketani | H04W 76/10 |
| 2019/0007182 A1* | 1/2019 | Li | H04L 1/007 |
| 2019/0166610 A1* | 5/2019 | Lee | H04W 72/12 |
| 2019/0373567 A1* | 12/2019 | Takeda | H04W 52/34 |

FOREIGN PATENT DOCUMENTS

| | | |
|---|---|---|
| JP | 2015531220 A | 10/2015 |
| JP | 2016174396 A | 9/2016 |
| JP | 2017516384 A | 6/2017 |
| KR | 20180137419 A | 12/2018 |
| RU | 2 485 700 C2 | 9/2008 |
| WO | 2009 145525 A2 | 12/2009 |
| WO | 2011 041623 A1 | 4/2011 |
| WO | 2011 139068 A2 | 11/2011 |
| WO | WO2015041579 A1 | 3/2015 |
| WO | WO2015107600 A1 | 7/2015 |
| WO | WO2015156521 A1 | 10/2015 |
| WO | 2016 142006 A1 | 9/2016 |
| WO | WO2016186077 A1 | 11/2016 |
| WO | 2017 008840 A1 | 1/2017 |
| WO | 2017014048 A1 | 1/2017 |
| WO | 2017 196250 A1 | 11/2017 |
| WO | 2018 029363 A1 | 2/2018 |
| WO | 2018 063067 A1 | 4/2018 |

OTHER PUBLICATIONS

3GPP TS 36.212 v.13.0.0; Technical Specification; 3rd Generation Partnership Project; Technical Specification Group Radio Access Network; Evolved Universal Terrestrial Radio Access (E-UTRA); Multiplexing and channel coding (Release 13)—Dec. 2015.
3GPP TSG-RAN WG1 Meeting #88; Athens, Greece; Source: Ericsson; Title: UCI on sPUSCH with short TTI (R1-1703264)—Feb. 13-17, 2017.
3GPP TSG-RAN WG1 Meeting #88bis; Spokane, USA; Source: Ericsson; Title: UCI on sPUSCH with short TTI (R1-1706079)—Apr. 3-7, 2017.
International Search Report for International application No. PCT/EP2018/052648—May 16, 2018.
3GPP TSG RAN WG1 Ad-Hoc Meeting; Spokane, USA; Source: Samsung; Title: On UCI Multiplexing in PUSCH (R1-1700948)—Jan. 16-20, 2017.
Communication Pursuant to Article 94(3) EPC issued for Application No. 18 703 556.3-1220—Sep. 12, 2019.
Japan Patent Office Official Action dated Oct. 30, 2020 in JP Application No. 2019-540065, 6 pages (not translated).
India Intellectual Property Office, Examination Report dated Feb. 2, 2021 in Application No. 201917029946, 5 pages (translated).
Japan Patent Office Notice of Allowance in JP Application No. 2019-540065, dated unknown (not translated).
China Patent Office, Office Action and Search report in CN Application No. 201880010073.5 dated Nov. 21, 2022 (not translated).
"UCI multiplexing on PUSCH with MIMO transmission," Panasonic, 3GPP TSG RAN WG1 Meeting #61, R1-102876, Montreal, Canada, May 10-14, 2010.
China Patent Office, Official Action and Search Report dated Jul. 10, 2023 in CN 201880010073.5 (not translated).
"DCI design for short tti," 3gpp tsg ran WG1 Meeting #85, R1-164060, Huawei, HiSilicon, May 23-27, 2016.

* cited by examiner

DYNAMIC MCS OFFSET FOR SHORT TTI

PRIORITY

This nonprovisional application is a U.S. National Stage Filing under 35 U.S.C. § 371 of International Patent Application Serial No. PCT/EP2018/052648 filed Feb. 2, 2018, and entitled "Dynamic MCS Offset for Short TTI" which claims priority to U.S. Provisional Patent Application No. 62/454,430 filed Feb. 3, 2017 both of which are hereby incorporated by reference in their entirety.

TECHNICAL FIELD

Particular embodiments are directed to wireless communications and, more particularly, to a dynamic configuration of modulation and coding scheme (MCS) offset for uplink control information (UCI) on a physical uplink shared channel (PUSCH) with a slot/subslot transmission or a short transmission time interval (sTTI).

BACKGROUND

In Third Generation Partnership Project (3GPP) long term evolution (LTE) systems, data transmissions in both downlink (i.e. from a network node or eNB to a wireless device or user equipment (UE)) and uplink (i.e., from a wireless device or UE to a network node or eNB) are organized into radio frames of 10 ms. Each radio frame consists of ten equally-sized subframes of length Tsubframe=1 ms, as shown in FIG. 1.

FIG. 1 is a block diagram illustrating an example LTE time-domain structure. The horizontal axis represents time. The 1 ms subframe is divided into 10 subframes (#0-#9).

LTE uses Orthogonal Frequency Division Multiplexing (OFDM) in the downlink and DFT-spread OFDM (also referred to as SC-FDMA) in the uplink (see 3GPP TS 36.211). The basic LTE downlink physical resource can be represented as a time-frequency grid as illustrated in FIG. 2.

FIG. 2 illustrates an example LTE downlink physical resource. Each square of the grid represents one resource element. Each column represents one OFDM symbol including cyclic prefix. Each resource element corresponds to one OFDM subcarrier during one OFDM symbol interval.

Resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

FIG. 3 is a block diagram illustrating an example LTE uplink resource grid. In the illustrated example, $N_{RB}^{UL}$ is the number of resource blocks (RBs) contained in the uplink system bandwidth and $N_{sc}^{RB}$ is the number of subcarriers in each RB, typically $N_{sc}^{RB}=12$. $N_{symb}^{UL}$ is the number of SC-OFDM symbols in each slot. $N_{symb}^{UL}=7$ for normal cyclic prefix (CP) and $N_{symb}^{UL}=6$ for extended CP. A subcarrier and a SC-OFDM symbol form an uplink resource element (RE).

FIG. 4 illustrates an example downlink subframe. Downlink data transmissions from an eNB to a UE are dynamically scheduled (i.e., in each subframe the base station transmits control information about to which terminals data is transmitted and upon which resource blocks the data is transmitted in the current downlink subframe). The control signaling is typically transmitted in the first 1, 2, 3 or 4 OFDM symbols in each subframe. The illustrated example includes a downlink system with 3 OFDM symbols as control.

Similar to downlink, uplink transmissions from a UE to an eNB are also dynamically scheduled through the downlink control channel. When a UE receives an uplink grant in subframe n, the UE transmits data in the uplink at subframe n+k, where k=4 for a frequency division duplex (FDD) system and k varies for time division duplex (TDD) systems.

LTE supports a number of physical channels for data transmissions. A downlink or an uplink physical channel corresponds to a set of resource elements carrying information originating from higher layers. A downlink or an uplink physical signal is used by the physical layer but does not carry information originating from higher layers. Some of the downlink physical channels and signals supported in LTE are: (a) Physical Downlink Shared Channel (PDSCH); (b) Physical Downlink Control Channel (PDCCH); (c) Enhanced Physical Downlink Control Channel (EPDCCH); and reference signals such as (d) Cell Specific Reference Signals (CRS); (e) DeModulation Reference Signal (DMRS) for PDSCH; and (f) Channel State Information Reference Signals (CSI-RS).

PDSCH is used mainly for carrying user traffic data and higher layer messages in the downlink. PDSCH is transmitted in a downlink subframe outside of the control region as shown in FIG. 4. Both PDCCH and EPDCCH are used to carry Downlink Control Information (DCI) such as physical resource block (PRB) allocation, modulation level and coding scheme (MCS), precoder used at the transmitter, etc. PDCCH is transmitted in the first one to four OFDM symbols in a downlink subframe (i.e., the control region) while EPDCCH is transmitted in the same region as PDSCH.

Some of the uplink physical channels and signals supported in LTE are: (a) Physical Uplink Shared Channel (PUSCH); (b) Physical Uplink Control Channel (PUCCH); (c) DeModulation Reference Signal (DMRS) for PUSCH; and (d) DeModulation Reference Signal (DMRS) for PUCCH. The PUSCH is used to carry uplink data or/and uplink control information from the UE to the eNodeB. The PUCCH is used to carry uplink control information from the UE to the eNodeB.

One goal of LTE is latency reduction. Packet data latency is one of the performance metrics that vendors, operators and end-users (via speed test applications) regularly measure. Latency measurements are performed in all phases of a radio access network system lifetime, such as when verifying a new software release or system component, when deploying a system, and when the system is in commercial operation.

One performance metric that guided the design of LTE is to achieve shorter latency than previous generations of 3GPP radio access technologies (RATs). LTE is recognized by end-users as a system that provides faster access to internet and lower data latencies than previous generations of mobile radio technologies.

Packet data latency is important not only for the perceived responsiveness of the system; but it also indirectly influences the throughput of the system. HTTP/TCP is the dominating application and transport layer protocol suite used on the internet today.

According to HTTP Archive (available at httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Thus, improved latency can improve the average throughput for this type of TCP based data transaction.

Radio resource efficiency may also be positively impacted by latency reductions. Lower packet data latency can increase the number of transmissions possible within a certain delay bound. Thus, higher Block Error Rate (BLER) targets may be used for the data transmissions, freeing up radio resources and potentially improving the capacity of the system.

One approach to latency reduction is a reduction of transport time of data and control signaling by adjusting the length of a transmission time interval (TTI). Reducing the length of a TTI and maintaining the bandwidth may reduce processing time at the transmitter and the receiver nodes because of less data to process within the TTI.

In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. Other LTE releases, such as LTE release 15 may specify transmissions with shorter TTIs, such as a slot or a few symbols (e.g., 2, 3, or 7 OFDM symbols). The short TTI may be referred to as a slot transmission (e.g. 7 symbols) or a subslot transmission (e.g. 2 or 3 symbols).

5G NR refers to a shortened transmission time interval as a short TTI (sTTI). A sTTI may have any duration in time and comprise resources on a number of OFDM or SC-FDMA symbols within a 1 ms subframe. NR may also refer to a mini-slot transmission.

As one example, the duration of the uplink short TTI may be 0.5 ms (i.e., seven OFDM or SC-FDMA symbols for the case with normal cyclic prefix). As another example, the duration of the short TTI may be 2 symbols.

The embodiments described below may apply to both LTE and NR. The terms slot transmission, subslot transmission, mini-slot, short TTI, and sTTI may be used interchangeably.

The 4G wireless access within LTE is based on DFT-spread OFDM (SC-FDMA) in the uplink. An example of DFT-spread OFDM is illustrated in FIG. 5.

FIG. 5 is a block diagram illustrating DFT-spread OFDM. The information bits are used to calculate an error detection code (e.g., Cyclic Redundancy Check (CRC)), channel coded, rate matched, and modulated to complex valued symbols such as QPSK, 16 QAM, or 64 QAM, for example. Symbols corresponding to several control entities and symbols corresponding to payload are then multiplexed, precoded by a DFT (transform precoding), mapped to a frequency interval in which it is allocated, transformed to the time domain, concatenated with a cyclic prefix and finally transmitted over air.

The order of some of the processing blocks illustrated in FIG. 5 might be changed. For example, the modulation might be placed after the multiplexing instead of before. The symbol constructed by the discrete Fourier transform (DFT), mapping, inverse fast Fourier transform (IFFT) and CP insertion is denoted as a SC-FDMA symbol in Section 5.6 of 3GPP TS 36.211. In LTE Release 8, a TTI includes fourteen SC-FDMA symbols.

DFT-spread OFDM as used in uplink has significantly lower PAPR (Peak to Average Power Ratio) as compared to OFDM. By having a low PAPR, the transmitter can be equipped with simpler and less energy consuming radio equipment, which is important for user devices where cost and battery consumption are important. In 5G systems, the single carrier property with low PAPR may be important not only for uplink but also for downlink and device to device transmissions.

Uplink control information (UCI) is used to support data transmission on downlink and uplink transport channels. The UCI includes: (a) scheduling request, indicating that the user equipment (UE) requests uplink resources for uplink data transmission; (b) hybrid automatic repeat request (HARQ) ACK/NACK, used to acknowledge the received data transport blocks on the physical downlink shared channel (PDSCH); and (c) channel state information (CSI) reports, consisting of channel quality indicator (CQI), precoding matrix indicator (PMI), rank index (RI), and CSI-RS resource indication (CRI). The CSI reports are related to downlink channel conditions and are used to assist downlink channel-dependent scheduling.

LTE supports two different methods for transmitting UCI. If the UE does not have a valid scheduling grant, the physical uplink control channel (PUCCH) is used for transmitting UCI. If the UE has a valid scheduling grant, then, the UCI is time multiplexed with the coded uplink shared channel (UL-SCH) on to the physical uplink shared channel (PUSCH) prior to DFT spreading and OFDM modulation to preserve the low cubic matric single-carrier property.

If the UE has a valid scheduling grant, the UCI is time multiplexed with the data on PUSCH. Because the UE is already scheduled, transmission of a scheduling request is not needed, and the in-band buffer status reports are sent as part of the MAC headers. Therefore, only HARQ ACK/NACK and CSI reports are transmitted on PUSCH.

FIG. 6 illustrates the time multiplexing of UCI and data on the PUSCH. In the illustrated example, CQI/PMI, RI/CRI and HARQ ACK/NACK are multiplexed with the data symbols on to PUSCH based on 3GPP TS 36.212 v13.0.0 and 3GPP TS 36.211 v13.0.0.

The column index l=0, 1, . . . , 13 corresponds to SC-FDMA symbol index. The row index k=0, 1, . . . , M is symbol index before transform precoding (see Section 5.3.3 in 3GPP TS 36.211), where M is the number of subcarriers allocated to the PUSCH.

Each box corresponds to a coded modulation symbol. Each column of the coded modulation symbols, in blocks of M symbols, are fed though a size-M DFT. Note that no DFT is applied to DMRS symbols (symbols 3 and 10 in FIG. 6). The structure of the DMRS itself ensures a low cubic matric.

The HARQ ACK/NACK is important for proper operation of the downlink. Thus, the HARQ ACK/NACK symbols are placed to the SC-FDMA symbols 2, 4, 9 and 11, which are close to DMRS, to achieve good channel estimation. There is a certain probability that the UE misses some downlink assignment on the PDCCH. In such cases, the actual HARQ feedback payload from the UE is different from the one expected by the eNodeB. To avoid the effect of such errors, the coded HARQ ACK/NACK symbols are punctured into the coded data on PUSCH.

The coded RI symbols are placed close to HARQ ACK/NACK symbol positions so that they are also close to DMRS to be able to achieve good channel estimation. This is motivated by the fact that the decoding of CQI/PMI relies on the correct decoding of RI. The CQI/PMI is mapped across the full subframe duration. The special mapping of CQI/PMI is less pronounced, because CSI reports are mainly useful for low-to-medium Doppler frequencies. The UL-SCH rate matching takes the presence of the CQI/PMI and RI into account. Note that RI can contain both rank indication and CSI-RS resource indication (CRI).

The size of the PUSCH control region may be determined according to the following. If UCI is multiplexed with UL-SCH data on PUSCH, then the amount of resources (i.e., the number of coded modulation symbols) for each type of control information can be obtained based on the corresponding formulas and expressions given in Section 5.2.2.6 of TS 36.212 v13.0.0. When UCI is sent via PUSCH without UL-SCH data, the amount of resources for each type of UCI is derived according to Section 5.2.4 in TS 36.212 v13.0.0 instead.

For UCI on PUSCH with UL-SCH data, particular values may be determined as follows. To determine the number of coded modulation symbols per layer Q' for HARQ ACK/NACK and RI/CRI:

For the case when only one transport block is transmitted in the PUSCH conveying the HARQ-ACK bits, RI or CRI bits:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH-initial}\right) \quad (1)$$

$$\approx \min\left(\left\lceil \frac{O}{Q_m \cdot R} \cdot \beta_{offset}^{PUSCH} \right\rceil, 4 \cdot M_{sc}^{PUSCH-initial}\right),$$

where: O is the number of HARQ-ACK bits, rank indicator bits or CRI bits, and $Q_m$ and R are the modulation order and coding rate of the transport block. $M_{sc}^{PUSCH-initial}$ is the scheduled bandwidth for initial PUSCH transmission for the transport block, expressed as a number of subcarriers. $N_{symb}^{PUSCH-initial}$ is the number of SC-FDMA symbols per TTI for initial PUSCH transmission for the same transport block, excluding the DMRS symbols and SRS symbols if SRS is transmitted in the initial PUSCH. C is the number of code blocks for initial PUSCH transmission for the same TB. $K_r$ is the number of bits in the code block number r. $\beta_{offset}^{PUSCH}$ is the MSC offset between the data and the control information, with $\beta_{offset}^{PUSCH}=\beta_{offset}^{HARQ\ ACK}$ for HARQ-ACK, and $\beta_{offset}^{PUSCH}=\beta_{offset}^{RI}$ for RI. $4 \cdot M_{sc}^{PUSCH-initial}$ is the maximum number of coded modulation symbols (i.e., the maximum amount of resources) for the corresponding control information.

For the case when two transport blocks are transmitted in the PUSCH conveying the HARQ-ACK bits, rank indicator bits or CRI bits:

$$Q' = \max\left[\min(Q'_{temp}, 4 \cdot M_{sc}^{PUSCH-initial}), Q'_{min}\right] \text{ with}$$

$$Q'_{temp} = \begin{bmatrix} O \cdot M_{sc}^{PUSCH-initial(1)} \cdot N_{symb}^{PUSCH-initial(1)} \cdot \\ \frac{M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} +} \\ \sum_{r=0}^{C^{(2)}-1} K_r^{(2)} \cdot M_{sc}^{PUSCH-initial(1)} \cdot N_{symb}^{PUSCH-initial(1)} \end{bmatrix} \quad (2)$$

$$\approx \left\lceil \frac{O}{Q_m^{(1)} \cdot R^{(1)}} \cdot \beta_{offset}^{PUSCH} + \frac{O}{Q_m^{(2)} \cdot R^{(2)}} \cdot \beta_{offset}^{PUSCH} \right\rceil$$

where O is the number of HARQ-ACK bits, rank indicator bits or CRI bits, and $Q_m^{(x)}$ and $R^{(x)}$, x={1,2}, are the modulation order and coding rate of the first and second transport block, respectively. $M_{sc}^{PUSCH-initial(x)}$, x={1,2} are the scheduled bandwidths for PUSCH transmission in the initial TTI for the first and second transport block, respectively, expressed as a number of subcarriers. $N_{symb}^{PUSCH-initial(x)}$, x={1,2} are the number of SC-FDMA symbols per TTI for initial PUSCH transmission for the first and second transport block, respectively, excluding the DMRS symbols and SRS symbols if SRS is transmitted in the initial sPUSCH. $C^{(x)}$, x={1,2} are the number of code blocks for initial PUSCH transmission for the first and second transport block, respectively. $K_r^{(x)}$, x={1,2} are the number of bits in the code block number r for the first and second transport block, respectively. $Q'_{min}=0$ if $O \leq 2$, $Q'_{min}=\lceil 2O/Q'_m \rceil$ if $3 \leq O \leq 11$ with $Q'_m=\min(Q_m^1, Q_m^2)$ where $Q_m^x$, x={1,2} is the modulation order of transport block "x", and $Q'_{min}=\lceil 2O_1/Q'_m \rceil + \lceil 2O_2/Q'_m \rceil$ if O>11 with $O_1=\lceil O/2 \rceil$ and $O_2=O-\lceil O/2 \rceil$. $\Theta_{offset}^{PUSCH}$ is the MSC offset between the data and the control information, with $\beta_{offset}^{PUSCH}=\beta_{offset}^{HARQ\ ACK}$ for HARQ-ACK, and $\beta_{offset}^{PUSCH}=\beta_{offset}^{RI}$ offset for RI.

To determine the number of coded modulation symbols per layer Q' for CQI/PMI:

$$Q' = \min\left(\left\lceil \frac{(O+L) \cdot M_{sc}^{PUSCH-initial(x)} \cdot}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right) \quad (3)$$

$$\approx \min\left(\left\lceil \frac{(O+L)}{Q_m^{(x)} \cdot R^{(x)}} \cdot \beta_{offset}^{PUSCH} \right\rceil, M_{sc}^{PUSCH} \cdot N_{symb}^{PUSCH} - Q_{RI}^{'(x)}\right)$$

where O is the number of CQI/PMI bits, and L is the number of CRC bits given by $$L = \begin{cases} 0 & O \leq 11 \\ 8 & \text{otherwise} \end{cases},$$

and $M_{sc}^{PUSCH}$ is the scheduled bandwidth for current PUSCH transmission for the transport block, expressed as a number of subcarriers. $N_{symb}^{PUSCH}$ is the number of SC-FDMA symbols for the current PUSCH transmission, excluding the DMRS symbols and SRS symbols if SRS is transmitted in the current PUSCH. $Q_{RI}^{(x)}$ and $Q_{RI}^{'(x)}$ are the number of coded bits of RI and the number of coded modulation symbols of RI, respectively, multiplexed with the transport block with the highest IMCS value. $Q_m^{(x)}$ and $R^{(x)}$ are the modulation order and coding rate of the transport block with the highest IMCS value indicated by the initial uplink grant. $N_{sc}^{PUSCH-initial(x)}$, $N_{symb}^{PUSCH-initial(x)}$, $C^{(x)}$ and $K_r^{(x)}$ are parameters related to the same transport block. $\beta_{offset}^{PUSCH}=\beta_{offset}^{CQI}$ is the MSC offset between the data and the CQI/PMI.

For UCI on PUSCH without UL-SCH data, particular values may be determined as follows. In case of full TTI operation (1 ms TTI), an eNB can schedule an aperiodic CQI report which is transmitted as UCI on PUSCH by the UE. The UE may not have any data in buffer and thus PUSCH will only contain UCI. In this case, the amount of resources for each type of UCI is derived as follows (see Section 5.2.4 in TS 36.212 v13.0.0).

To determine the number of coded modulation symbols per layer Q' for HARQ ACK/NACK and RI/CRI:

$$Q' = \min\left(\left\lceil \frac{O \cdot M_{sc}^{PUSCH} \cdot M_{symb}^{PUSCH} \cdot \beta_{offset}^{PUSCH}}{O_{CQI-MIN}} \right\rceil, 4 \cdot M_{sc}^{PUSCH\text{-}initial}\right) \quad (4)$$

where $O_{CQI-MIN}$ is the number of CQI bits including CRC bits assuming rank equals to 1 for all serving cells for which an aperiodic CSI report is triggered, $\beta_{offset}^{PUSCH}$ is the MCS offset between HARQ-ACK and CQI/PMI, or the MSC offset between RI/CRI and CQI/PMI. For HARQ-ACK information, $\beta_{offset}^{PUSCH} = \beta_{offset}^{HARQ\text{-}ACK} / \beta_{offset}^{CQI}$, for RI information, $\beta_{offset}^{PUSCH} = \beta_{offset}^{RI} / \beta_{offset}^{CQI}$. The other parameters are defined in Section 2.1.3.2.1.

To determine the number of coded modulation symbols per layer Q' for CQI/PMI:

$$\begin{aligned} Q'_{CQI} &= Q_{CQI}/Q_m \quad (5) \\ &= N_{symb}^{PUSCH} \cdot M_{sc}^{PUSCH} - Q_{RI}/Q_m \\ &= N_{symb}^{PUSCH} \cdot M_{sc}^{PUSCH} - Q'_{RI} \end{aligned}$$

The parameters are defined in Section 2.1.3.2.1.

The UCI MCS offset, $\beta_{offset}^{PUSCH}$, may be determined as follows. The UCI MCS offset, $\beta_{offset}^{PUSCH} >= 1$, is used for controlling the additional coding gain (i.e., lower coding rate) for the UCI over data. The MCS offset parameter is user-specific and is semi-statically configured by a high-layer signaling index for each type of UCI.

For each type of UCI, HARQ-ACK, RI and CQI/PMI, a table is pre-defined for mapping the index signaled by high layers to the MCS offset value (see Section 8.6.3 in TS 36.213). Different signaling indexes are used for single and multi-codeword PUSCH transmissions. The offset value for HARQ-ACK also depends on the payload size, where a different signaling index will be used if the UE transmits more than 22 HARQ-ACK bits.

As described above, one way to reduce latency is to reduce the TTI length. In uplink transmissions, one or more SC-FDMA symbols with DMRS transmitted for each short TTI leads to an increased overhead and a corresponding decrease in data rates when the length of the TTI is reduced.

To reduce the overhead, reference signals from several transmitters may be multiplexed into the same SC-FDMA symbol while the user data from different transmitters may be transmitted in separate SC-FDMA symbols. Another option is to use different uplink short TTI patterns for PUSCH based on different short TTI lengths. In particular, the positions of reference symbols and data symbols, and the length of each short TTI for a PUSCH may be fixed for each SF.

The term short PUSCH (sPUSCH) may be used to denote the uplink physical shared channel with short TTIs. The terms slot PUSCH or subslot PUSCH may be used to denote the uplink physical shared channel with slot duration or subslot duration. A traditional way of multiplexing UCI and data on PUSCH is designed for a fixed length of 1 ms PUSCH transmission. For TTI length of 7 symbols, the multiplexing method in one slot can be reused. However, if TTI length is less than 7 symbols, some SC-FDMA symbols that are used for UCI may become unavailable. In addition, the DMRS positions for sPUSCH may be changed so that the existing UCI mapping rule is not applicable. Therefore, particular solutions may include different UCI mapping solutions that account for different short TTI lengths and different DMRS configurations for a sPUSCH.

The traditional high layer signaling indexes for determining the UCI MCS offset value for PUSCH do not support transmitting UCI on sPUSCH. Moreover, the MCS offset values for UCI transmitting on sPUSCH need to be designed to control the coding rate of UCI on sPUSCH, and to determine the number of resources allocated for each type of UCI that are transmitted on PUSCH with shortened TTI.

Some proposed solutions to determine MCS offset for UCI transmission on sPUSCH rely on indexes which are signaled by a higher layer. The MCS offsets for different type of UCI are then determined by mapping the indexes in pre-defined tables. However, the indexes signaled by the higher layer are semi-static. Because the system throughput in a shortened TTI is more sensitive to the UCI coding rate (i.e., lower coding rate for UCI, less resources left for UL-SCH data), given that the UCI payload and/or UL-SCH data payload on different shortened TTIs could vary significantly, eNodeB thus cannot make a good balance between system throughput and HARQ-ACK robustness through one static or semi-static MCS offset.

In LTE Rel-8, the MCS offset for UCI transmission on PUSCH also relies on indexes which are signaled by a higher layer. The number of resource elements usable by data in a LTE Rel-8 TTI, however, is much greater than in a shortened TTI. This makes the Rel-8 PUSCH performance less sensitive to the UCI payload compared to sPUSCH. A semi-static configuration of MCS offset in Rel-8 LTE is sufficient, but it may be suboptimal for short TTI.

The alternatives described in the Background section are not necessarily alternatives that have been previously conceived or pursued. Therefore, unless otherwise indicated herein, the alternatives described in the Background section are not prior art and are not admitted to be prior art by inclusion in the Background section.

SUMMARY

The embodiments described herein include configuring modulation coding scheme (MCS) offset for uplink control information (UCI) on a short physical uplink shared channel (sPUSCH) dynamically or semi-dynamically when transmitting UCI on PUSCH with shortened TTIs or a slot/subslot transmissions. Particular embodiments include ways of determining and dynamically signaling the UCI MCS offset index or value when UCI is transmitted on sPUSCH.

According to some embodiments, a method in a network node comprises: determining that UCI and a data payload will be sent via a physical uplink shared channel on a slot or subslot transmission; determining a MCS offset for transmission of the UCI via the physical uplink shared channel; and communicating the MCS offset to a wireless device. Communicating the MCS offset to the wireless device may comprise sending downlink control information (DCI) to the wireless device.

In particular embodiments, the UCI and the data payload will be sent via the physical uplink shared channel with a slot/subslot transmission or a short transmission time interval (sTTI). The MCS offset may comprise an offset value or an index. The MCS offset may selected from a set of values configured semi-statically (e.g., via radio resource control (RRC) signaling). The MCS offset may comprise an index that indicates a particular value from the semi-statically configured set of values.

In particular embodiments, determining that the UCI and the data payload will be sent via a physical uplink shared channel comprises receiving a scheduling request from the wireless device. Determining the MCS offset may be based on a size of the UCI, based on a size of the data payload, based on a ratio of a size of the UCI and a size of the data payload, based on the MCS for the data payload, and/or based on an expected interference level.

In particular embodiments, the network node communicates the MCS offset to the wireless device per granted uplink transmission. The UCI type may comprise at least one of HARQ-ACK, RI, CRI, and CQI/PMI. A value indicated by the MCS offset for a first UCI type may be different than a value indicated by the MCS offset for a second UCI type.

According to some embodiments, a network node comprising processing circuitry operable to: determine that UCI and a data payload will be sent via a physical uplink shared channel on a slot or subslot transmission; determine a MCS offset for transmission of the UCI via the physical uplink shared channel; and communicate the MCS offset to a wireless device. The processing circuitry may be operable to communicate the MCS offset to the wireless device may by sending downlink control information (DCI) to the wireless device.

In particular embodiments, the UCI and the data payload will be sent via the physical uplink shared channel with a sTTI or slot/subslot transmission. The MCS offset may comprise an offset value or an index. The processing circuitry may be operable to select the MCS offset from a set of values configured semi-statically (e.g., via RRC signaling). The MCS offset may comprise an index that indicates a particular value from the semi-statically configured set of values.

In particular embodiments, the processing circuitry is operable to determine that the UCI and the data payload will be sent via a physical uplink shared channel by receiving a scheduling request from the wireless device. The processing circuitry may be operable to determine the MCS offset based on a size of the UCI, based on a size of the data payload, based on a ratio of a size of the UCI and a size of the data payload, based on the MCS for the data payload, and/or based on an expected interference level.

In particular embodiments, the processing circuitry is operable to communicate the MCS offset to the wireless device per granted uplink transmission. The UCI type may comprise at least one of HARQ-ACK, RI, CRI, and CQI/PMI. A value indicated by the MCS offset for a first UCI type may be different than a value indicated by the MCS offset for a second UCI type.

According to some embodiments, a method in a wireless device comprises: determining that UCI and a data payload will be sent via a physical uplink shared channel on a slot or subslot transmission; receiving a MCS offset for transmission of the UCI via the physical uplink shared channel; and communicating, to a network node, the UCI using the MCS offset. Receiving the MCS offset from the network node may comprise receiving DCI.

In particular embodiments, the UCI and the data payload will be sent via the physical uplink shared channel with a slot or subslot transmission. The MCS offset may comprise an offset value or an index. The MCS offset may be selected from a set of values configured semi-statically (e.g., by RRC signaling). The MCS offset may comprise an index that indicates a particular value from the semi-statically configured set of values.

In particular embodiments, the received the MCS offset is based on a size of the UCI, based on a size of the data payload, based on a ratio of a size of the UCI and a size of the data payload, based on the MCS for the data payload, and/or based on an expected interference level.

In particular embodiments, the received MCS offset is received per granted uplink transmission. The UCI type may comprise at least one of HARQ-ACK, RI, CRI, and CQI/PMI. A value indicated by the MCS offset for a first UCI type may be different than a value indicated by the MCS offset for a second UCI type.

According to some embodiments, a wireless device comprises processing circuitry operable to: determine that UCI and a data payload will be sent via a physical uplink shared channel on a slot or subslot transmission; receive a MCS offset for transmission of the UCI via the physical uplink shared channel; and communicate, to a network node, the UCI using the MCS offset. The processing circuitry may be operable to receive the MCS offset from the network node may by receiving DCI. In particular embodiments, the UCI and the data payload will be sent via the physical uplink shared channel with a slot or subslot transmission. The MCS offset may comprise an offset value or an index. The processing circuitry may be operable to select the MCS offset from a set of values configured semi-statically (e.g., by receiving RRC signaling). The MCS offset may comprise an index that indicates a particular value from the semi-statically configured set of values.

In particular embodiments, the received the MCS offset is based on a size of the UCI, based on a size of the data payload, based on a ratio of a size of the UCI and a size of the data payload, based on the MCS for the data payload, and/or based on an expected interference level.

In particular embodiments, the processing circuitry is operable to receive the MCS offset per granted uplink transmission. The UCI type may comprise at least one of HARQ-ACK, RI, CRI, and CQI/PMI. A value indicated by the MCS offset for a first UCI type may be different than a value indicated by the MCS offset for a second UCI type.

According to some embodiments, a network node comprises an UCI determining module, a MCS module, and a communicating module. The UCI determining module is operable to determine that UCI and a data payload will be sent via a physical uplink shared channel on a slot or subslot transmission. The MCS determining module is operable to determine a MCS offset for transmission of the UCI via the physical uplink shared channel. The communicating module is operable to communicate the MCS offset to a wireless device.

According to some embodiments, a wireless device comprises an UCI determining module, a receiving module, and a communicating module. The UCI determining module is operable to determine that UCI and a data payload will be sent via a physical uplink shared channel on a slot or subslot transmission. The receiving module is operable to receive a MCS offset for transmission of the UCI via the physical uplink shared channel. The communicating module is operable to communicate, to a network node, the UCI using the MCS offset.

Also disclosed is a computer program product. The computer program product comprises instructions stored on non-transient computer-readable media which, when executed by a processor, perform the steps of: determining that UCI and a data payload will be sent via a physical uplink shared channel on a slot or subslot transmission; determining a MCS offset for transmission of the UCI via the physical uplink shared channel; and communicating the MCS offset to a wireless device.

Another computer program product comprises instructions stored on non-transient computer-readable media which, when executed by a processor, perform the steps of: determining that UCI and a data payload will be sent via a physical uplink shared channel on a slot or subslot transmission; receiving a MCS offset for transmission of the UCI via the physical uplink shared channel; and communicating, to a network node, the UCI using the MCS offset.

Particular embodiments may exhibit some of the following technical advantages. For example, by configuring the MCS offset for UCI dynamically or semi-dynamically, an eNodeB can adjust the UCI coding rate adaptively when UCI is transmitted on sPUSCH. By accounting for the UCI payload and/or the MCS used for data transmission on sPUSCH, the eNodeB may have improved control of UCI on sPUSCH. Thus, the eNodeB may configure the system with a favorable trade-off between the UCI transmission reliability (e.g., lower coding rate for UCI, less resources left for UL-SCH data) and the system throughput (e.g., higher coding rate for UCI, more resources left for UL-SCH data). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
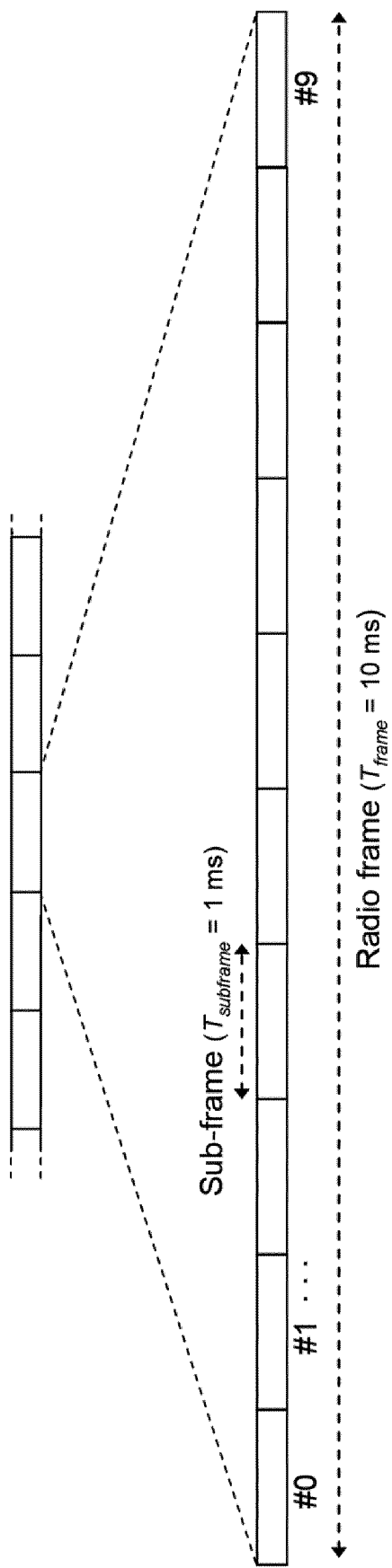
FIG. 1 is a block diagram illustrating an example LTE time-domain structure.
Figure 2:
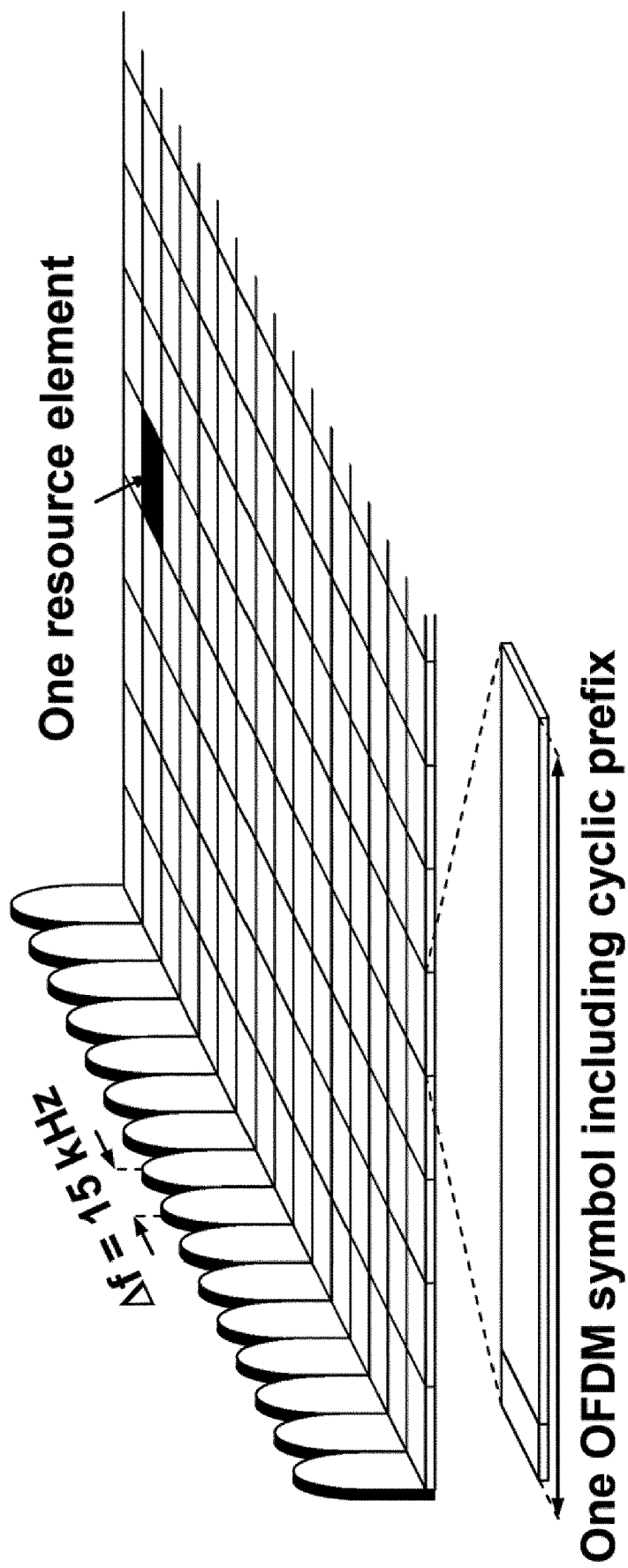
FIG. 2 illustrates an example LTE downlink physical resource.
Figure 3:
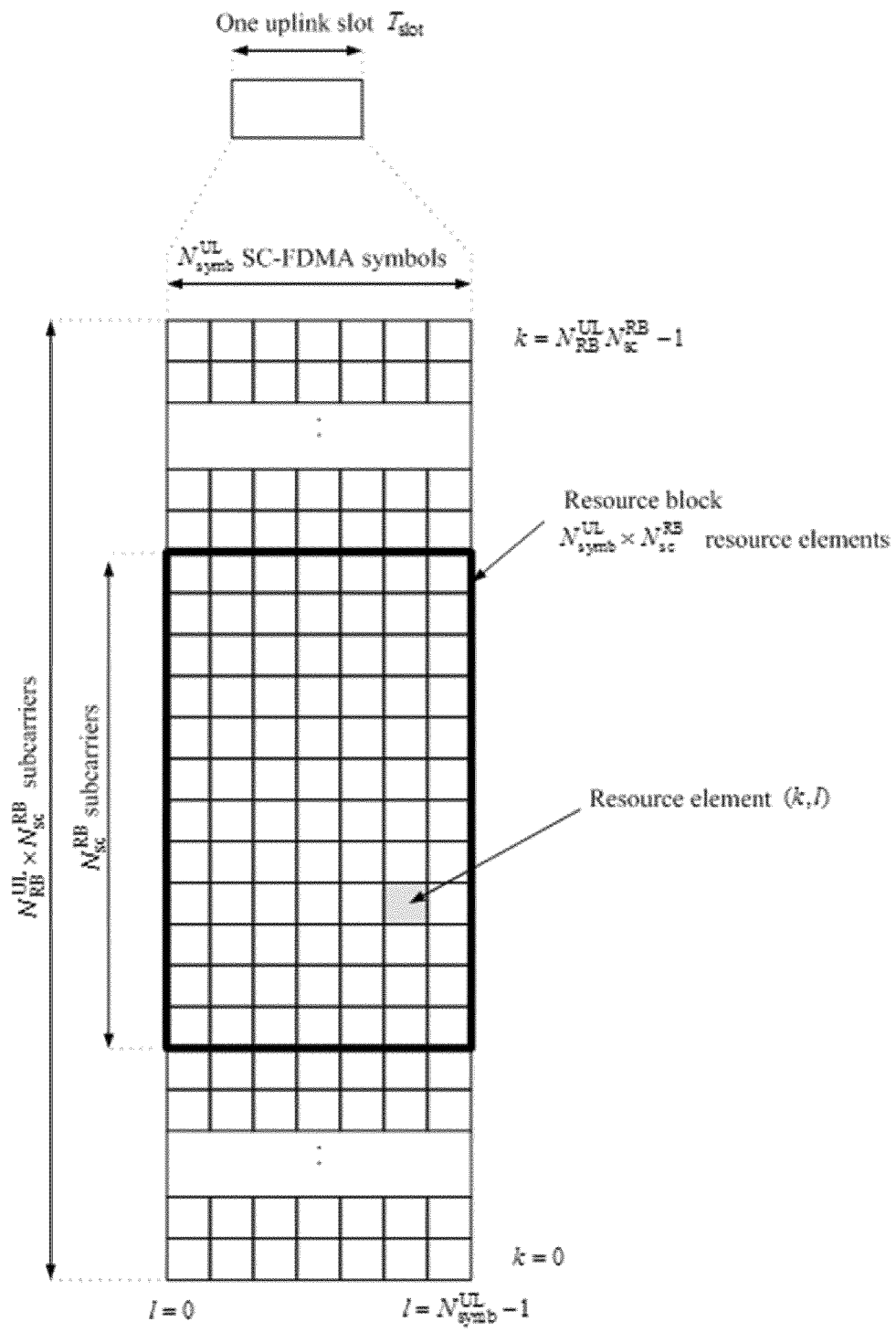
FIG. 3 is a block diagram illustrating an example LTE uplink resource grid.
Figure 4:
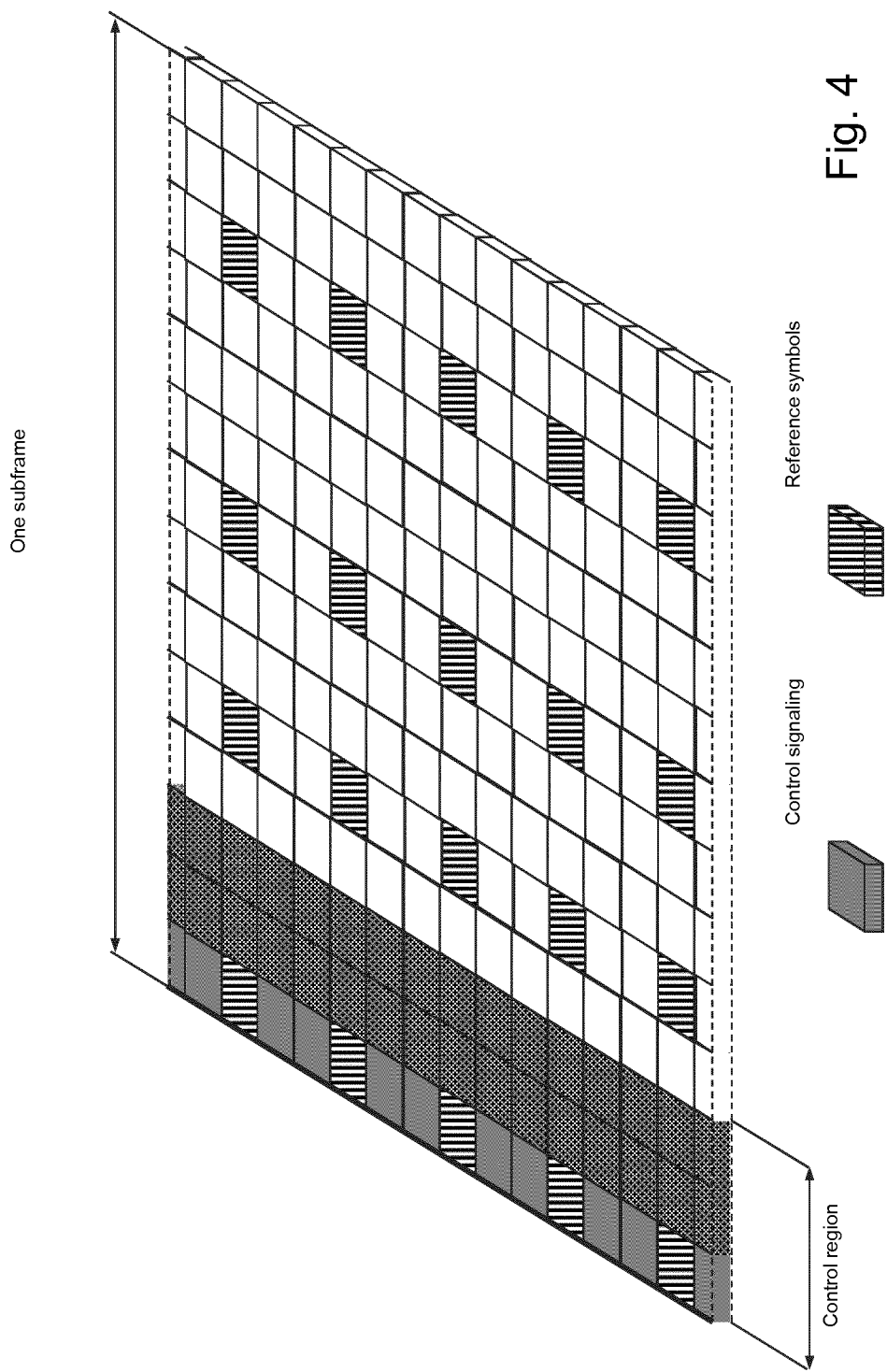
FIG. 4 illustrates an example downlink subframe.
Figure 5:
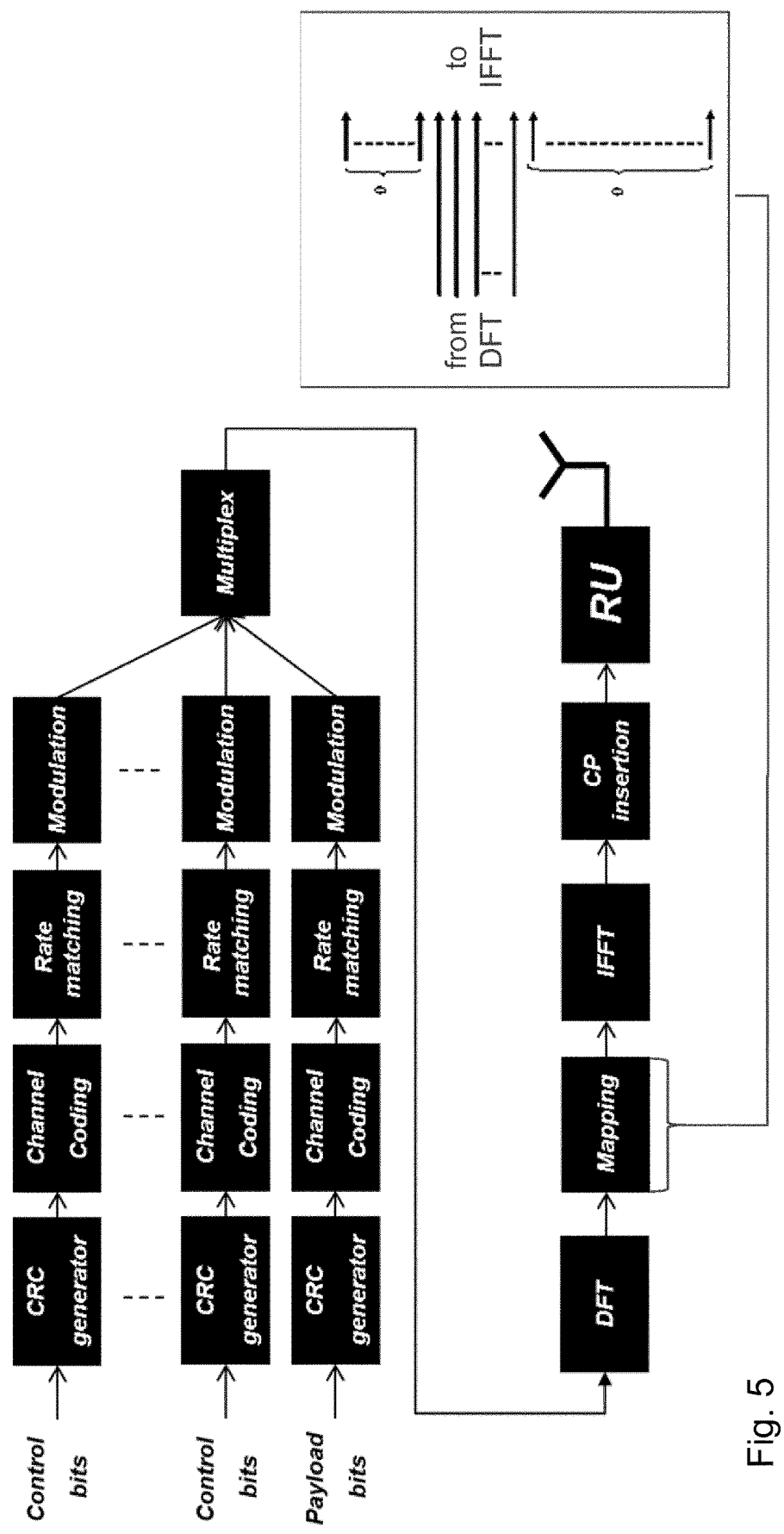
FIG. 5 is a block diagram illustrating DFT-spread OFDM.
Figure 6:
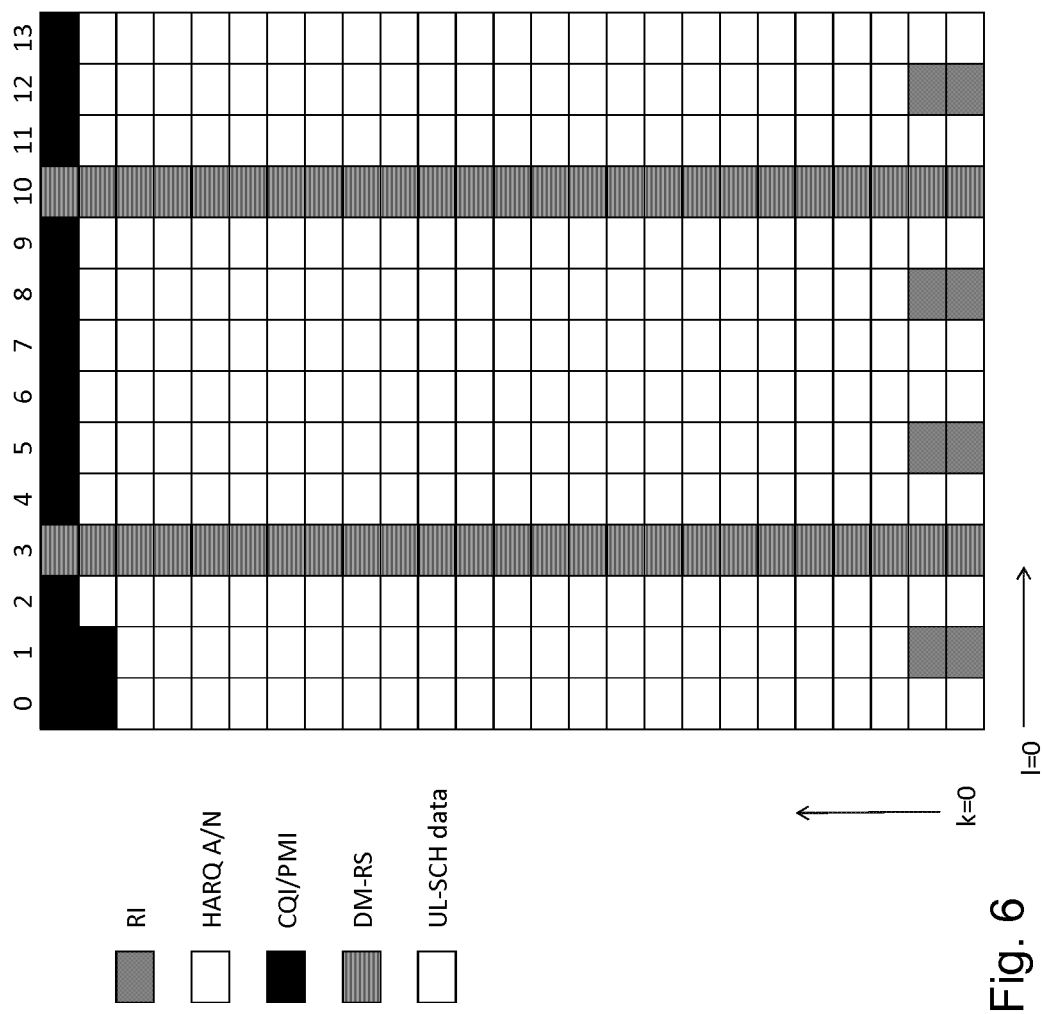
FIG. 6 illustrates the time multiplexing of UCI and data on the PUSCH.

A Third Generation Partnership Project (3GPP) long term evolution (LTE) wireless network may use a reduced or shortened transmission time interval (sTTI) to reduce latency. A sTTI includes fewer symbols than a traditional TTI. For sTTI length of 7 symbols, the multiplexing method in one slot can be reused. However, if a sTTI length is less than 7 symbols, some SC-FDMA symbols that are used for uplink control information (UCI) may not be available. Additionally, the DMRS positions for a short physical uplink shared channel (sPUSCH) may be changed and the existing UCI mapping rule may not be applicable. A shortened transmission time interval may also be referred to as a slot or subslot transmission. The shortened (or short) TTI may refer to a slot transmission (e.g. 7 symbols) or a subslot transmission (e.g. 2 or 3 symbols), which may alternatively be referred to as a mini-slot transmission.

Particular embodiments obviate the problems described above and include configuring modulation coding scheme (MCS) offset for UCI on a sPUSCH dynamically or semi-dynamically when transmitting UCI on sPUSCH. Particular embodiments include ways of determining and dynamically signaling the UCI MCS offset index or value when UCI is transmitted on sPUSCH.

By configuring the MCS offset for UCI dynamically or semi-dynamically, particular embodiments may adjust the UCI coding rate adaptively when UCI is transmitted on sPUSCH. By accounting for the UCI payload and/or the MCS used for data transmission on sPUSCH, particular embodiments may improve control of UCI on sPUSCH. Thus, particular embodiments may configure the system with a favorable trade-off between the UCI transmission reliability (e.g., lower coding rate for UCI, less resources left for UL-SCH data) and the system throughput (e.g., higher coding rate for UCI, more resources left for UL-SCH data).

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 7-11B of the drawings, like numerals being used for like and corresponding parts of the various drawings. LTE is used throughout this disclosure as an example cellular system, but the ideas presented herein may apply to other wireless communication systems as well, such as fifth generation (5G) new radio (NR), or any other suitable communication system.

Figure 7:
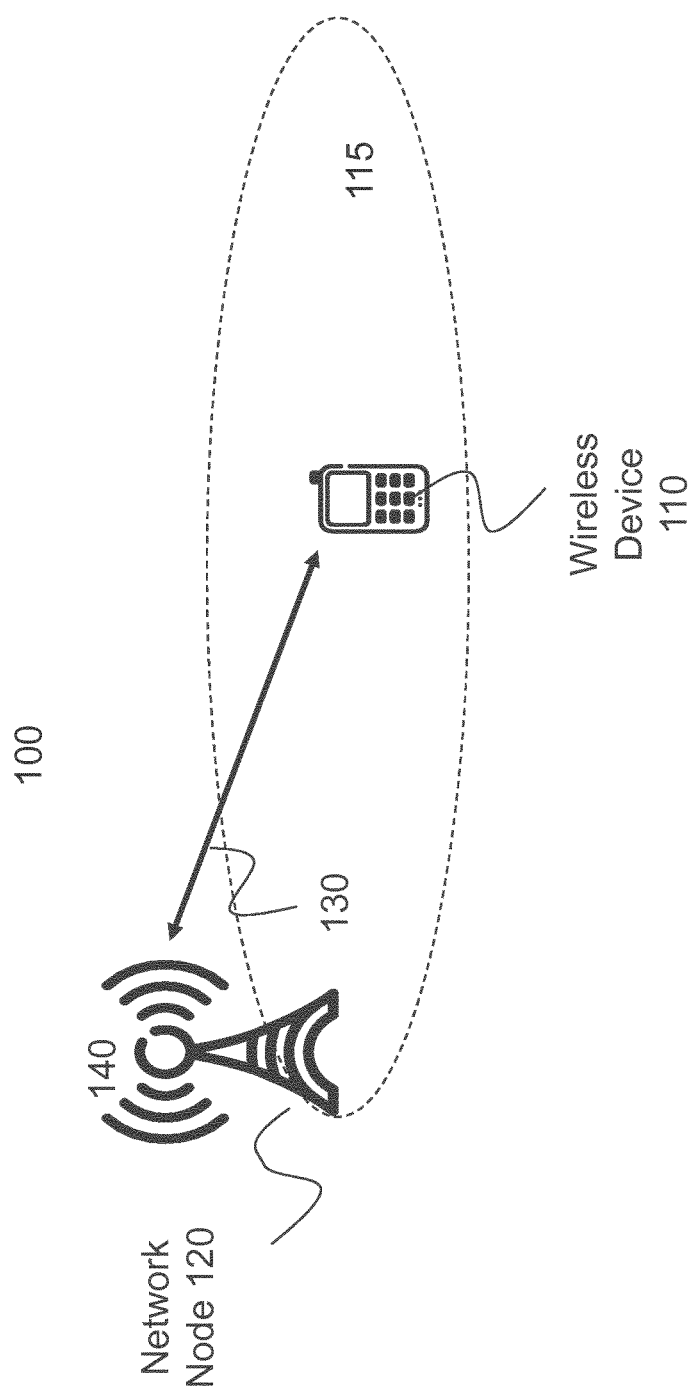
FIG. 7 is a block diagram illustrating an example wireless network, according to some embodiments.

FIG. 7 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may include transmission units or transmission time intervals (TTI) (e.g., subframes) such as those described with respect to FIGS. 1-6. The TTI may include slot/subslot transmissions or shortened TTI (e.g., TTI comprising two, three, seven, etc. symbols). Wireless device 110 and/or network node 120 may transmit control information in wireless signal 130. The control information may include an MCS offset. Depending on the control information payload and/or MCS used for data transmission when UCI is transmitted on sPUSCH, network node 120 may dynamically or semi-dynamically configure the MCS offset that is used to determine the size of the corresponding UCI region in sPUSCH. Particular algorithms for dynamically signaling an MCS offset are described in more detail with respect to FIGS. 8 and 9.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

Particular embodiments may configure UCI MCS offset dynamically or semi-dynamically for transmitting UCI on sPUSCH. Depending on the UCI payload and/or MCS used for data transmission when UCI is transmitted on sPUSCH, the MCS offset that is used to determine the size of the corresponding UCI region in sPUSCH is dynamically or semi-dynamically configured by an eNodeB, such as network node 120. The UCI can be HARQ-ACK, RI, CRI, CQI/PMI, etc.

Some embodiments use different signaling indexes to configure the offset values of different types of UCI. In a particular embodiment, a network node signals the UCI MCS offset index on a TTI or short TTI basis. In a similar embodiment, the time granularity over which the MCS offset index is configured is set by a pre-defined number of TTIs or short TTIs. In a further embodiment, the signaling of the MCS offset index may be performed aperiodically in a persistent manner with a configuration being valid until the network instructs the wireless device to use another setting.

In some embodiments, the network node determines the UCI MCS offset index based on: (a) the UCI payload that is to be transmitted in sPUSCH; (b) the ratio between UCI payload and data payload that are to be transmitted in sPUSCH; and/or (c) the MCS used for data transmission on sPUSCH.

In some embodiments, the network node signals the UCI MCS offset value on a TTI/sTTI basis. In a particular embodiment, the time granularity over which the MCS offset value is configured is set by a pre-defined number of TTIs or short TTIs. In a further embodiment, the signaling of the MCS offset value is performed aperiodically in a persistent manner with a configuration being valid until the network instructs the UE to use another setting. The MCS offset value signaled from the network node may be used directly to determine the size of the UCI region when transmitting UCI on sPUSCH.

In some embodiments, the network node determines the UCI MCS offset value based on: (a) the UCI payload that is to be transmitted in sPUSCH; (b) the ratio between UCI payload and data payload that are to be transmitted in sPUSCH; and/or (c) the MCS used for data transmission on sPUSCH.

In some embodiments, the UCI MCS offset index or value is configured through a pre-defined number of DCI bits from network node to wireless device on a TTI or sTTI basis. For example, three DCI bits may be used to configure the UCI MCS offset. In the embodiments that signal an MCS offset index, the wireless device will have in total eight UCI MCS offset values that can be used to determine the size of UCI region on sPUSCH. In the embodiments that signal an MCS value, the UCI MCS offset value can be in the range of [1, 2, 3, . . . , 7] or [0.5, 1, 2.5, . . . , 3.5] depending on the pre-defined granularity.

In some embodiments, the set of MCS offset index/value can be chosen from a complete set of values in the specification. The network node configures more than one MCS offset index for a given UCI type over RRC and the wireless device selects the MCS offset to apply in a given uplink sTTI dynamically based on a pre-defined rule and/or information contained in the uplink grant for this uplink sTTI and/or information about UCI to be transmitted in this uplink sTTI.

Information of the uplink grant that can be used for MCS offset selection can be the MCS or transport block size (TBS) of the data transmission on sPUSCH. An example of information about UCI that can be used for MCS offset selection is UCI payload. Pre-defined rules can be that the wireless device determines the MCS offset value based on the UCI payload, or that the wireless device determines the MCS offset value based on the ratio between UCI payload and data payload, or that the wireless device determines the MCS offset value based on the MCS used for the data transmission on the sPUSCH.

For example, an eNodeB may configure four indexes of the MCS offset to be used for HARQ feedback over RRC, each one valid for a different range of sPUSCH MCS. The pre-defined rule is to select the valid MCS offset in a given uplink sTTI based on sPUSCH MCS. The UE receives an uplink grant for a sPUSCH transmission with a MCS 20 that corresponds to an uplink sTTI where HARQ feedback is expected. The MCS offset for HARQ feedback is selected as the MCS offset index pre-configured for the range of sPUSCH MCS containing MCS 20.

Particular embodiments may reduce signaling overhead. In a specific embodiment to the proposals above, the set of MCS offset index/value can be chosen from a complete set of values in the specification. To reduce the number of bits for MCS offset indication in the uplink DCI, the sub-set of values to be used can be determined semi-statically (using a longer time scale than used for the signaling of the MCS offset index/value), e.g. by RRC signaling.

For example, the specification may include a pre-defined MCS offset table with sixteen entries to choose from. The eNodeB may configure over RRC the UEs only to use a sub-set of four MCS offsets from the pre-defined table. The uplink DCI then also needs to include two bits to indicate precisely which of the four MCS offsets must be applied in a given uplink sTTI.

In some embodiments, another way to reduce signaling overhead is to use the same offset index to one or more UCI field, where a certain index applies a pre-defined mapping to each UCI field. For example, signaling one index implies a particular value to be used for HARQ, CRI/RI and CQI/PMI, instead of using a fully flexible signaling of a separate index for each UCI field. Considering that one goal is to receive all control information, a similar level of redundancy can be expected on each transmitted UCI field. If for example HARQ is considered more important for the receiver, then the pre-defined mapping could be configured with more redundancy over the transmitted HARQ bits.

In some embodiments, a one-to-one mapping between the MCS index used for data transmission and the MCS offset value for each type of UCI is predefined. Based on the predefined one-to-one mapping, the UCI MCS offset value is implicitly indicated by the bit field in the uplink DCI used for signaling the MCS for the corresponding sPUSCH transmission.

Particular embodiments may include methods in a network node and a wireless device. The examples and embodiments described above may be generally represented by the flowcharts in FIGS. 8 and 9.

Figure 8:
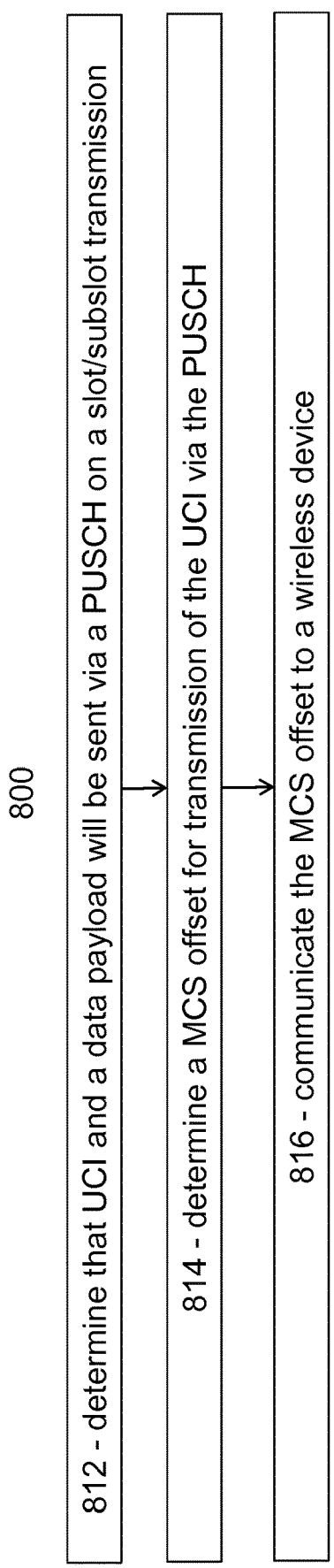
FIG. 8 is a flow diagram illustrating an example method in a network node, according to some embodiments.

FIG. 8 is a flow diagram illustrating an example method in a network node, according to some embodiments. In particular embodiments, one or more steps of FIG. 8 may be performed by network node 120 of wireless network 100 described with respect to FIG. 7.

The method begins at step 812, where the network node determines that UCI and a data payload will be sent via a PUSCH. For example, network node 120 may determine that wireless device 110 has uplink data to send and that wireless device 110 communicates with network node 120 using a shortened TTI (e.g., slot/subslot/mini-slot transmission). In particular embodiments, determining that the UCI and the data payload will be sent via a PUSCH comprises receiving a scheduling request from wireless device 110.

At step 814, the network node determines a MCS offset for transmission of the UCI via the PUSCH with the sTTI, the MCS offset based on one or more of a size of the UCI, a size of the data payload, a ratio of a size of the UCI and a size of the data payload, the MCS for the data payload, and/or an expected interference level. For example, network node 120 may determine an MCS offset for one or more of the HARQ-ACK, RI, CRI, and/or CQI/PMI based on any of the embodiments described above.

In particular embodiments, the MCS offset may be represented by a particular value, or an index into a table of values. The MCS offset may selected from a set of values configured semi-statically (e.g., via radio resource control (RRC) signaling). The MCS offset may be determined independently for different UCI parameters.

At step 816, the network node communicates the MCS offset to a wireless device. For example, network node 120 may signal the MCS offset to wireless device 110 according to any of the embodiments described above. The signaling may comprise a pre-defined number of DCI bits, or any other suitable communication between a network node and a wireless device. The signaling may occur for every TTI, periodically, or at any suitable interval.

Modifications, additions, or omissions may be made to method 800. Additionally, one or more steps in method 800 of FIG. 8 may be performed in parallel or in any suitable order. The steps of method 800 may be repeated over time as necessary.

A wireless device, such as wireless device 110, may receive the MCS offset configuration and use it to transmit UCI in a slot or subslot transmission or sTTI uplink. An example is illustrated in FIG. 9.

Figure 9:
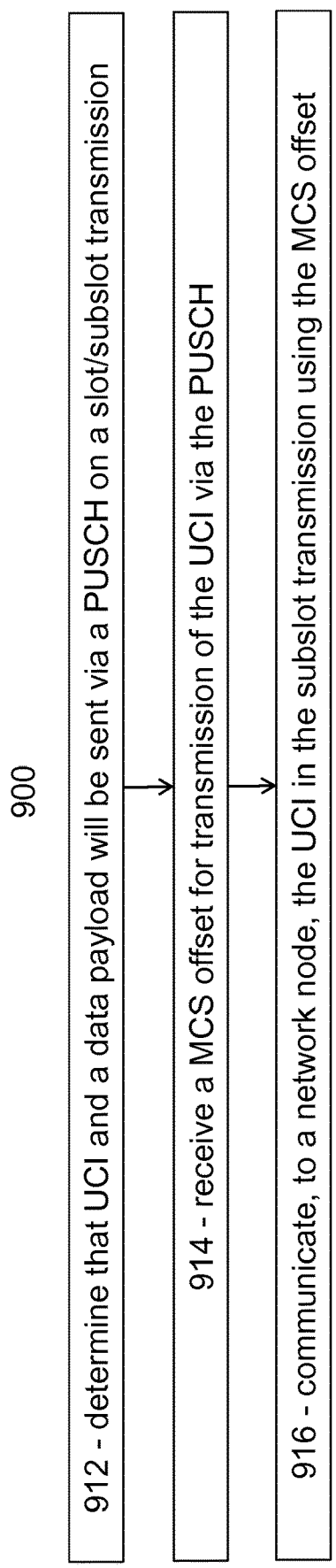
FIG. 9 is a flow diagram illustrating an example method in a wireless device, according to some embodiments.

FIG. 9 is a flow diagram illustrating an example method in a wireless device, according to some embodiments. In particular embodiments, one or more steps of FIG. 9 may be performed by wireless device 110 of wireless network 100 described with respect to FIG. 7.

The method begins at step 912, where the wireless device determines that UCI and a data payload will be sent via a PUSCH with a sTTI. For example, wireless device 110 may determine that it has uplink data to send to network node 120 using a slot or subslot transmission (i.e., shortened TTI).

At step 914, the wireless device receives a MCS offset for transmission of the UCI via the PUSCH with the sTTI. The MCS offset is based on one or more of a size of the UCI, a size of the data payload, a ratio of a size of the UCI and a size of the data payload, the MCS for the data payload, and/or an expected interference level. For example, network node 120 may determine an MCS offset for one or more of the HARQ-ACK, RI, CRI, and/or CQI/PMI based on any of the embodiments described above. Network node 120 may communicate the MCS offset to wireless device 110.

In particular embodiments, the MCS offset may be represented by a particular value, or an index into a table of values. The MCS offset may be selected from a set of values configured semi-statically (e.g., by RRC signaling. The MCS offset may be determined independently for different UCI parameters.

Wireless device 110 may receive the MCS offset via signaling from network node 120 according to any of the embodiments described above. The signaling may comprise a pre-defined number of DCI bits, or any other suitable communication between a network node and a wireless device. The signaling may occur for every TTI, periodically, or at any suitable interval.

At step 916, the wireless device communicates, to the network node, the UCI in the sTTI using the MCS offset. For example, wireless device 110 may encode payload data for an uplink sTTI using a first MCS. Wireless device 110 may encode UCI for the uplink sTTI using an MCS derived from the MCS offset. Wireless device 110 may transmit the sTTI to network node 120.

Modifications, additions, or omissions may be made to method 900. Additionally, one or more steps in method 900 of FIG. 9 may be performed in parallel or in any suitable order. The steps of method 900 may be repeated over time as necessary.

Although the embodiments described herein use examples of uplink from a wireless device to a network node, other embodiments may perform the MCS offset determinations for sTTI transmissions (uplink or downlink) between any suitable components of network 100.

Figure 10B:
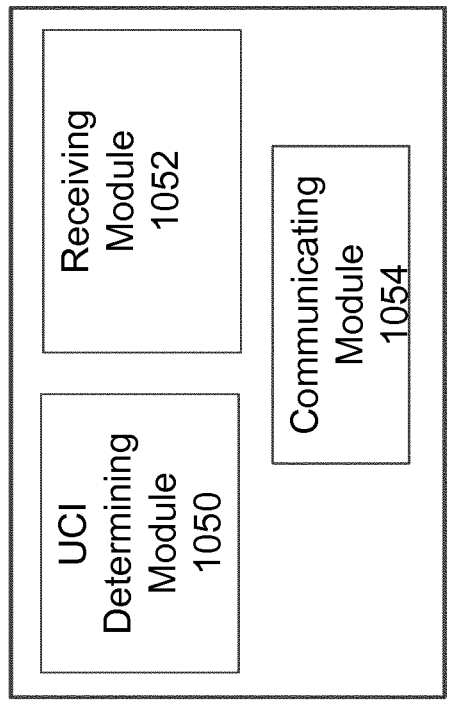
FIG. 10B is a block diagram illustrating example components of a wireless device.
Figure 10A:
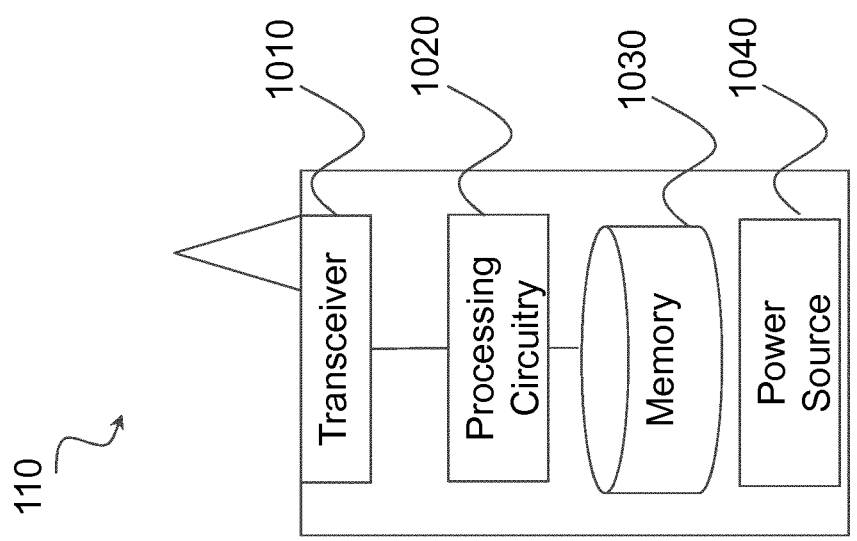
FIG. 10A is a block diagram illustrating an example embodiment of a wireless device.

FIG. 10A is a block diagram illustrating an example embodiment of a wireless device. The wireless device is an example of the wireless devices 110 illustrated in FIG. 7. In particular embodiments, the wireless device is capable of receiving an MCS offset configuration and encoding UCI data in an uplink sTTI (i.e., slot/subslot/mini-slot transmission) using the MCS offset.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processing circuitry 1020, memory 1030, and power source 1040. In some embodiments, transceiver 1010 facilitates transmitting wireless signals to and receiving wireless signals from wireless network node 120 (e.g., via an antenna), processing circuitry 1020 executes instructions to provide some or all of the functionality described herein as provided by the wireless device, and memory 1030 stores the instructions executed by processing circuitry 1020. Power source 1040 supplies electrical power to one or more of the components of wireless device 110, such as transceiver 1010, processing circuitry 1020, and/or memory 1030.

Processing circuitry 1020 includes any suitable combination of hardware and software implemented in one or more integrated circuits or modules to execute instructions and manipulate data to perform some or all of the described functions of the wireless device. In some embodiments, processing circuitry 1020 may include, for example, one or more computers, one more programmable logic devices, one or more central processing units (CPUs), one or more microprocessors, one or more applications, and/or other logic, and/or any suitable combination of the preceding. Processing circuitry 1020 may include analog and/or digital circuitry configured to perform some or all of the described functions of wireless device 110. For example, processing circuitry 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1040 is generally operable to supply electrical power to the components of wireless device 110. Power source 1040 may include any suitable type of battery, such as lithium-ion, lithium-air, lithium polymer, nickel cadmium, nickel metal hydride, or any other suitable type of battery for supplying power to a wireless device. In particular embodiments, processing circuitry 1020 in communication with transceiver 1010 receives an MCS offset configuration and encodes UCI data in an uplink sTTI using the MCS offset.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

FIG. 10B is a block diagram illustrating example components of a wireless device 110. The components may include receiving module 1050, UCI determining module 1052, and communicating module 1054.

Receiving module 1050 may perform the receiving functions of wireless device 110. For example, receiving module 1050 may receive an MCS offset for encoding UCI for a sTTI. Receiving module 1050 may receive the MCD offset according to any of the examples and embodiments described above (e.g., step 914 of FIG. 9). In certain embodiments, receiving module 1050 may include or be included in processing circuitry 1020. In particular embodiments, receiving module 1050 may communicate with UCI determining module 1052 and communicating module 1054.

UCI determining module 1052 may perform the UCI determining functions of wireless device 110. For example, UCI determining module 1052 may determine that wireless device 110 has a data payload and UCI information for uplink transmission in a sTTI according to any of the examples and embodiments described above (e.g., step 912 of FIG. 9). In certain embodiments, UCI determining module 1052 may include or be included in processing circuitry 1020. In particular embodiments, UCI determining module 1052 may communicate with receiving module 1050 and communicating module 1054.

Communicating module 1054 may perform the communicating functions of wireless device 110. For example, communicating module 1054 may transmit the sTTI to network node 120 according to any of the examples and embodiments described above (e.g., step 916 of FIG. 9). In certain embodiments, communicating module 1054 may include or be included in processing circuitry 1020. In particular embodiments, communicating module 1054 may communicate with receiving module 1050 and UCI determining module 1052.

Figure 11B:
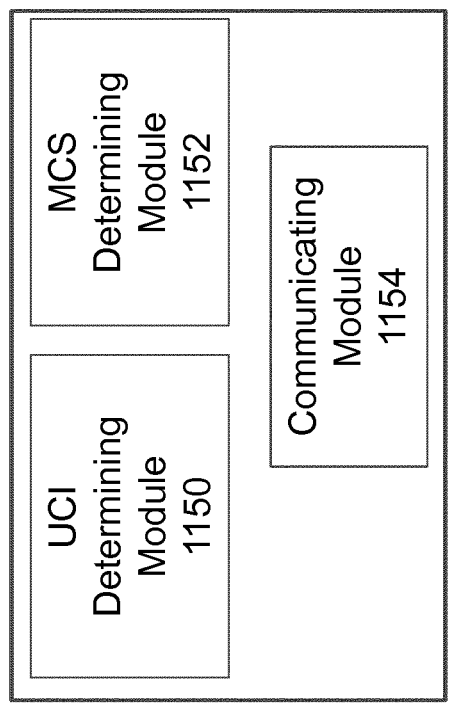
FIG. 11B is a block diagram illustrating example components of a network node.
Figure 11A:
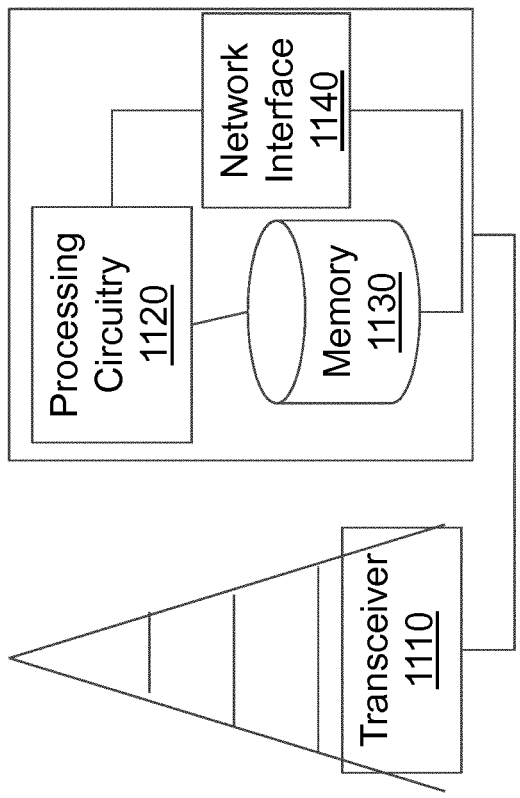
FIG. 11A is a block diagram illustrating an example embodiment of a network node.

FIG. 11A is a block diagram illustrating an example embodiment of a network node. The network node is an example of the network node 120 illustrated in FIG. 7. In particular embodiments, the network node is capable of determining an MCS offset for UCI in a sTTI and communicating the MCS offset to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1110, at least one processing circuitry 1120, at least one memory 1130, and at least one network interface 1140. Transceiver 1110 facilitates transmitting wireless signals to and receiving wireless signals from a wireless device, such as wireless devices 110 (e.g., via an antenna); processing circuitry 1120 executes instructions to provide some or all of the functionality described above as being provided by a network node 120; memory 1130 stores the instructions executed by processing circuitry 1120; and network interface 1140 communicates signals to backend network components, such as a gateway, switch, router, Internet, Public Switched Telephone Network (PSTN), controller, and/or other network nodes 120. Processing circuitry 1120 and memory 1130 can be of the same types as described with respect to processing circuitry 1020 and memory 1030 of FIG. 10A above.

In some embodiments, network interface 1140 is communicatively coupled to processing circuitry 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network. In particular embodiments, processing circuitry 1120 in communication with transceiver 1110 determines an MCS offset for UCI in a sTTI and communicates the MCS offset to a wireless device.

Other embodiments of network node 120 include additional components (beyond those shown in FIG. 11A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 11B is a block diagram illustrating example components of a network node 120. The components may include UCI determining module 1150, MCS determining module 1152, and communicating module 1154.

UCI determining module 1150 may perform the UCI determining functions of network node 120. For example, UCI determining module 1150 may determine wireless device 110 has uplink information to transmit in a sTTI according to any of the examples and embodiments described above (e.g., step 812 of FIG. 8). In certain embodiments, UCI determining module 1150 may include or be included in processing circuitry 1120. In particular embodiments, UCI determining module 1150 may communicate with MCS determining module 1152 and communicating module 1154.

MCS determining module 1152 may perform the MCS determining functions of network node 120. For example, MCS determining module 1152 may determine an MCS offset according to any of the embodiments described with respect to FIGS. 8 and 9. In certain embodiments, MCS determining module 1152 may include or be included in processing circuitry 1120. In particular embodiments, MCS determining module 1152 may communicate with UCI determining module 1150 and communicating module 1154.

Communicating module 1154 may perform the communicating functions of network node 120. For example, communicating module 1154 may signal an MCS offset to wireless device 110 according to any of the examples and embodiments described above (e.g., step 816 of FIG. 8). In certain embodiments, communicating module 1154 may include or be included in processing circuitry 1120. In particular embodiments, communicating module 1154 may communicate with UCI determining module 1150 and MCS determining module 1152.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The following examples provide a non-limiting example of how certain aspects of the proposed solutions could be implemented within the framework of a specific communication standard. In particular, the following examples provide a non-limiting example of how the proposed solutions could be implemented within the framework of a 3GPP TSG RAN standard. The changes described are merely intended to illustrate how certain aspects of the proposed solutions could be implemented in a particular standard. However, the proposed solutions could also be implemented in other suitable manners, both in the 3GPP Specification and in other specifications or standards.

Short TTI and reduced processing includes the following objectives. For Frame structure type 1: [RAN1, RAN2, RAN4] objectives include a transmission duration based on 2-symbol sTTI, 4-symbol sTTI, and 1-slot sTTI for sPUCCH/sPUSCH. Down-selection is not precluded. For Frame structure type 2: [RAN1, RAN2, RAN4] objectives include a transmission duration based on 1-slot sTTI for sPDSCH/sPDCCH/sPUSCH/sPUCCH. sPUSCH may support UCI transmission on sPUSCH.

LTE supports two methods for transmitting UCI. If the UE does not have a valid scheduling grant, the PUCCH is used for transmitting UCI. If the UE has a valid scheduling grant, the UCI is instead time multiplexed with the coded UL-SCH on to the PUSCH, prior to DFT spreading and OFDM modulation to preserve the low cubic metric single-carrier property.

When UCI is transmitted on PUSCH, transmission of a scheduling request is not needed because the UE is already scheduled. Instead, buffer status reports are sent in-band as part of the MAC headers. Therefore, only HARQ ACK/NACK and CSI reports are transmitted on PUSCH.

The HARQ ACK/NACK is important for proper operation of the downlink. Thus, the HARQ ACK/NACK symbols are placed close to DMRS to achieve good channel estimation. There is a certain probability that the UE misses some downlink assignment on the PDCCH. In such cases, the actual HARQ feedback payload from the UE is different from the one expected by the eNodeB. To avoid making the reception of the UL-SCH dependent on the PDCCH reception, the coded HARQ ACK/NACK symbols are punctured into the coded data on PUSCH.

The coded RI symbols are placed close to HARQ ACK/NACK symbol positions, so that they are also close to DMRS to be able to achieve good channel estimation. This is motivated by the fact that the decoding of CQI/PMI relies on the correct decoding of RI. The CQI/PMI is mapped across the full subframe duration. The special mapping of CQI/PMI is less pronounced, since CSI reports are mainly useful for low-to-medium Doppler frequencies. The UL-SCH rate matching takes the presence of the CQI/PMI and RI into account.

For 7-symbol sPUSCH, if the legacy DMRS configuration is used, a straightforward solution for multiplexing UCI on sPUSCH is to reuse the mapping rule for PUSCH. However, for a 2-symbol sTTI, because the multiple SC-FDMA symbols that are used for UCI mapping in a 1 ms TTI are not available, the legacy mapping rule cannot be reused. Thus, for 2-symbol sTTI, a new mapping rule for UCI transmitted on sPUSCH is defined.

Figure 12:
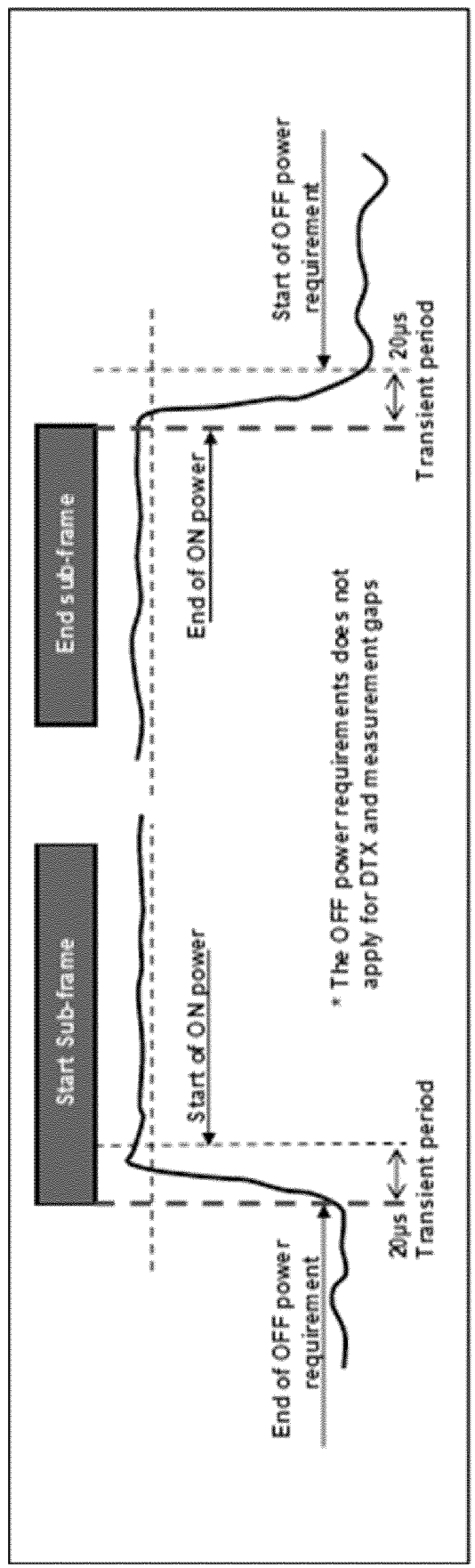
FIG. 12 is a general ON/OFF time mask.

The impact of the transient period related to the ON/OFF mask from RF implementation needs to be considered. As shown in FIG. 12, in the legacy LTE specification, the OFF region is defined to avoid harmful interference from transmitter to the network when the transmitter has no useful signal for the receiver. Between the ON and the OFF region, a transient period is allowed where the transmitted signal is undefined.

LTE includes an ON/OFF mask for 2-OS sTTI. The general mask in case of single sTTI scheduling is defined such that the transient period is located outside the sTTI. However, there are still cases in which the transient period will be located inside the sTTI. For example, when UE is scheduled across consecutive sTTIs and power change occurs between the sTTIs, then the power ramping up/down will occur inside the sTTI, or when SRS transmission is preceding or succeeding the sTTI. If multiplexing UCI in the resource elements where power ramping occurs, then eNodeB may not be able to detect the control information correctly. To protect the transmitted control information, when mapping UCI on sPUSCH for 2-OS sTTI, the power ON/OFF mask may be considered. Thus, a mapping rule for UCI on sPUSCH for 2-OS sTTI may be considered together with the knowledge of the known transient period. One rule is to multiplex UCI in the safe end of the SC-FDMA symbol, when the power ramping occurs in the other end of the SC-FDMA symbol.

In legacy LTE, the UCI MCS offset is used to control the additional coding gain (i.e., lower coding rate) for the UCI over data. The MCS offset parameter is user-specific and is semi-statically configured by the eNB by a high-layer signaling index for each type of UCI, i.e., for HARQ-ACK, RI or CRI, and CQI/PMI. Different signaling indexes are used for single and multi-codeword PUSCH transmissions. For HARQ-ACK, the offset value also depends on the payload size, where a different signaling index is used if the UE transmits more than 22 HARQ-ACK bits.

For each type of UCI, there is a pre-defined table for mapping the high-layer signaling index to the corresponding MCS offset value. The MCS offset value is selected by the eNB based on the target BLER of the data, the operating point of the UCI and the UCI payload size. The existing pre-defined beta offset tables for different type of UCI transmitted on PUSCH were designed for 1 ms PUSCH, in which 11 or 12 data symbols are transmitted.

However, for a shortened TTI, especially for a 2-symbol TTI, there can be only one data symbols transmitted in one sTTI. If multiplexing UCI on such sPUSCH, considering the trade-off between UCI transmission reliability (i.e. lower coding rate for UCI, less resources left for UL-SCH data) and the system throughput (i.e. higher coding rate for UCI, more resources left for UL-SCH data), some of the existing beta offset values may not be applicable.

For example, some very large HARQ-ACK beta offset values in the current existing table, which are originally designed for transmitting HARQ-ACK on PUSCH under the subframe bundling mode cannot be used for transmitting HARQ-ACK on a 2-OS sPUSCH, because it may result in a large performance degradation for the data transmission.

Because the existing large beta offset set values will not be used for transmitting HARQ-ACK on sPUSCH, the MCS offset table can be further optimized for HARQ-ACK on sPUSCH. For example, a sub-set of the values in the current HARQ-ACK MCS offset table, i.e., discarding those large beta values, can be used for signaling the MCS offset for HARQ-ACK on sPUSCH to reduce the signaling overhead. Another solution is to keep the same table size as the legacy table, but re-design the offset values so that all values in the table are applicable. With this solution, the granularity of the offset values.

As stated above, the beta offset for different type of UCI is configured semi-statically through an index signaled from a high layer. Compared to the legacy 1-ms TTI transmission, for shortened TTI, especially for 2-os sTTI when DMRS is scheduled in the sTTI, there can be only one symbol (comparing to 11 or 12 symbols in the legacy case) that can be used for sPUSCH transmission. In the case when UCI is mapped on sPUSCH, the sPUSCH performance might become more sensitive to the change of the data MCS and/or UCI payloads.

To evaluate if the legacy way of configuring beta offset for UCI on sPUSCH is still good enough, performance for 2-os sTTI with UCI on sPUSCH was studied. In the studied case, one DMRS symbol and one data symbol are scheduled in a 2-os sPUSCH, and only HARQ-ACK control information is considered in the simulations. The other simulation assumptions can be found below.

In the study, BLER performance of the data as well as the HARQ detection probabilities are plotted. The false alarm probability of NACK->ACK for the HARQ detection is focused because it has a higher requirement than ACK misdetection probability.

The simulation results for cases with varying data MCS, e.g. QPSK R=⅓ and 64 QAM R=⅚, and varying HARQ-ACK payload, e.g. 2-bit and 10-bit HARQ-ACK payload are described. When comparing different data MCS carrying the same number of HARQ bits, if targeting at 10% BLER and a NACK->ACK detection probability of 0.001, a beta offset value of 2 is sufficient for 64 QAM r⅚, while for QPSK r⅓, it requires a beta offset value of 3.125 to obtain a NACK->ACK probability below 0.001.

From the simulations, for the cases of small HARQ payload, e.g. 2 bits, the BLER performance of data is not sensitive to the beta offset values. In other words, using a higher value of beta offset which is required by low data MCS into a high data MCS, no sPUSCH impact have been observed. In the case of large HARQ payload size, such as 10 bits, if using a larger beta offset value than needed, for example using a beta offset value of 3.125, which is required in the QPSK MCS, to a 64 QAM MCS in which a beta offset value of 1 is sufficient, results in a very small (~0.2 dB) sPUSCH performance degradation. Thus, a common beta offset value is sufficient to different data MCS cases, and the common beta offset value can be selected to be the one which meets both the data and the HARQ performance requirements under the low MCS.

Abbreviations used in the preceding description include:
3GPP Third Generation Partnership Project
ACK Acknowledgement
BLER Block Error Rate
BTS Base Transceiver Station
CRC Cyclic Redundancy Check
CSI Channel State Information
D2D Device to Device
DCI Downlink Control Information
DL Downlink
DMRS Demodulation Reference Signal
ePDCCH enhanced Physical Downlink Control Channel
eNB eNodeB
FDD Frequency Division Duplex
HARQ Hybrid Automatic Repeat Request
LTE Long Term Evolution
M2M Machine to Machine
MAC Medium Access Control
MCS Modulation and Coding Scheme
MIMO Multi-Input Multi-Output
MTC Machine Type Communication
NAK Negative Acknowledgement
NR New Radio
OFDM Orthogonal Frequency Division Multiplex
PDCCH Physical Downlink Control Channel
PDSCH Physical Downlink Shared Channel
PMI Precoding Matrix Indicator
PRB Physical Resource Block
PUCCH Physical Uplink Control Channel
PUSCH Physical Uplink Shared Channel
RAN Radio Access Network
RAT Radio Access Technology
RB Resource Block
RBS Radio Base Station
RE Resource Element
RI Rank Index
RNC Radio Network Controller
RRC Radio Resource Control
RRH Remote Radio Head
RRU Remote Radio Unit
RS Reference Signal
SC-FDMA Single Carrier-Frequency Division Multiple Access
sPDCCH short Physical Downlink Control Channel
sPDSCH short Physical Downlink Shared Channel
sPUSCH short Physical Uplink Shared Channel
SF SubFrame
sTTI Shortened TTI
TDD Time Division Duplex
TTI Transmission Time Interval
UCI Uplink Control Information
UE User Equipment
UL Uplink
UL-SCH Uplink Shared Channel
UTRAN Universal Terrestrial Radio Access Network
WAN Wireless Access Network

The invention claimed is:

1. A method in a network node, the method comprising:
determining that uplink control information, UCI, and a data payload will be sent from a wireless device via a physical uplink shared channel;
determining a modulation coding scheme, MCS, offset for transmission of the UCI via the physical uplink shared channel;
configuring the wireless device with more than one MCS offset index for a given UCI type over radio resource control, RRC, signaling, wherein each MCS offset index corresponds to a MCS offset; and
sending downlink control information, DCI, to the wireless device indicating a MCS offset index to communicate the determined MCS offset to the wireless device.

2. The method of claim 1, wherein the MCS offset is selected from a set of values configured semi-statically.

3. The method of claim 1, wherein configuring more than one MCS offset index for a given UCI type comprises configuring different MCS offset indexes to configure the MCS offset of different types of UCI.

4. The method of claim 1, wherein determining that the UCI and the data payload will be sent via a physical uplink shared channel comprises receiving a scheduling request from the wireless device.

5. The method of claim 1, wherein the UCI comprises at least one of the following UCI types: hybrid automatic repeat request acknowledgment, HARQ-ACK, rank indicator, RI, channel state information reference signal resource indicator, CRI, and channel quality indicator, CQI/precoding matrix indicator, PMI.

6. The method of claim 5, wherein a value indicated by a MCS offset for a first UCI type is different than a value indicated by the MCS offset for a second UCI type.

7. The method of claim 1, wherein the network node communicates the MCS offset to the wireless device per granted uplink transmission.

8. A network node comprising processing circuitry, the processing circuitry operable to:
determine that uplink control information, UCI, and a data payload will be sent from a wireless device via a physical uplink shared channel;
determine a modulation coding scheme, MCS, offset for transmission of the UCI via the physical uplink shared channel;
configure the wireless device with more than one MCS offset index for a given UCI type over radio resource control, RRC, signaling, wherein each MCS offset index corresponds to a MCS offset; and
send downlink control information, DCI, to the wireless device indicating a MCS offset index to communicate the determined MCS offset to the wireless device.

9. A method in a wireless device, the method comprising:
determining that uplink control information, UCI, and a data payload will be sent via a physical uplink shared channel;
receiving a modulation coding scheme, MCS, offset for transmission of the UCI via the physical uplink shared channel;
receiving more than one MCS offset index for a given UCI type over radio resource control, RRC, signaling, wherein each MCS offset index corresponds to a MCS offset; and
receiving downlink control information, DCI, indicating an MCS offset index; and
communicating, to a network node, the UCI using the MCS offset corresponding to the MCS offset index.

10. The method of claim 9, wherein the MCS offset is selected from a set of values configured semi-statically.

11. The method of claim 9, wherein receiving more than one MCS offset index for a given UCI type comprises receiving different MCS offset indexes to configure the MCS offset of different types of UCI.

12. The method of claim 9, wherein the UCI comprises at least one of the following UCI types: hybrid automatic repeat request acknowledgment, HARQ-ACK, rank indicator, RI, channel state information reference signal resource indicator, CRI, and channel quality indicator, CQI/precoding matrix indicator, PMI.

13. The method of claim 12, wherein a value indicated by a MCS offset for a first UCI type is different than a value indicated by the MCS offset for a second UCI type.

14. The method of claim 9, wherein the received MCS offset is received per granted uplink transmission.

15. A wireless device comprising processing circuitry, the processing circuitry operable to:
- determine that uplink control information, UCI, and a data payload will be sent via a physical uplink shared channel on a slot or subslot transmission;
- receive a modulation coding scheme, MCS, offset for transmission of the UCI via the physical uplink shared channel;
- receive more than one MCS offset index for a given UCI type over radio resource control, RRC, signaling, wherein each MCS offset index corresponds to a MCS offset; and
- receive downlink control information, DCI, indicating an MCS offset index; and
- communicate, to a network node, the UCI using the MCS offset corresponding to the MCS offset index.

\* \* \* \* \*